(12) United States Patent
Casper et al.

(10) Patent No.: US 11,102,926 B2
(45) Date of Patent: Aug. 31, 2021

(54) GRAIN BIN SKIRT

(71) Applicants: Benjamin Glade Casper, Basin City, WA (US); Kim Haws, Mesa, WA (US)

(72) Inventors: Benjamin Glade Casper, Basin City, WA (US); Kim Haws, Mesa, WA (US)

(73) Assignee: Benjamin G. Casper, Basin City, WA (US)

( * ) Notice: Subject to any disclaimer, the term of this patent is extended or adjusted under 35 U.S.C. 154(b) by 370 days.

(21) Appl. No.: 16/258,583

(22) Filed: Jan. 26, 2019

(65) Prior Publication Data

US 2019/0230853 A1 Aug. 1, 2019

Related U.S. Application Data

(60) Provisional application No. 62/622,445, filed on Jan. 26, 2018.

(51) Int. Cl.

| | |
|---|---|
| *E04F 13/08* | (2006.01) |
| *A01D 41/12* | (2006.01) |
| *A23B 9/08* | (2006.01) |
| *A01F 25/14* | (2006.01) |
| *A23B 9/00* | (2006.01) |
| *A01F 25/16* | (2006.01) |
| *A01F 25/22* | (2006.01) |
| *E04F 13/07* | (2006.01) |
| *E04F 19/04* | (2006.01) |

(52) U.S. Cl.
CPC ..... *A01D 41/1208* (2013.01); *A01D 41/1252* (2013.01); *A01F 25/14* (2013.01); *A01F 25/163* (2013.01); *A23B 9/00* (2013.01); *A23B 9/08* (2013.01); *E04F 13/0864* (2013.01); *A01F 25/22* (2013.01); *E04F 13/07* (2013.01); *E04F 19/04* (2013.01)

(58) Field of Classification Search
CPC ............ A01D 41/1208; A01D 41/1252; A01F 25/163; A01F 25/14; A01F 25/22; E04F 13/0864; E04F 19/04; E04F 13/07; A23B 9/00; A23B 9/08; E04H 7/22
See application file for complete search history.

(56) References Cited

U.S. PATENT DOCUMENTS

| | | | | |
|---|---|---|---|---|
| 4,009,520 | A * | 3/1977 | Sukup | E04H 7/30 34/233 |
| 5,581,959 | A * | 12/1996 | Occhipinti | B29C 53/043 52/198 |
| 6,122,887 | A * | 9/2000 | Massett | E02D 31/02 52/169.11 |
| 9,797,129 | B2 * | 10/2017 | Uno | B32B 25/08 |
| 2006/0032158 | A1 * | 2/2006 | Moule | E02D 31/06 52/169.5 |
| 2017/0342677 | A1 * | 11/2017 | Uno | E02D 27/38 |

* cited by examiner

*Primary Examiner* — Patrick J Maestri
(74) *Attorney, Agent, or Firm* — Alliance IP, LLC (57) ABSTRACT

In one embodiment, a system comprising an impervious bin skirt, the bin skirt comprising at least one section, a top portion of a first section of the bin skirt to couple to a side wall of the bin to shield a portion of a base of the bin from moisture penetration.

19 Claims, 6 Drawing Sheets

# GRAIN BIN SKIRT

RELATED APPLICATION

This application claims benefit under 35 U.S.C. § 119(e) of U.S. Provisional Application Ser. No. 62/622,445, entitled "GRAIN BIN SKIRT" filed Jan. 26, 2018.

BACKGROUND

Since the inception of galvanized steel grain bins in the early 1900s, grain bins have generally retained a unique structural shape. This design allows the bins to hold a substantial amount of grain with a minimum of framework and metal skin. The reduction in construction materials results from a round configuration of the sidewalls and conical roof. Bin sizes have increased through the decades, but the vast majority of bins have retained the same shape. Bins may be constructed of relatively light galvanized metal, which may make up both the roof structure and the walled areas.

BRIEF DESCRIPTION OF THE DRAWINGS

Like reference numbers and designations in the various drawings indicate like elements.

DETAILED DESCRIPTION

Figure 1:
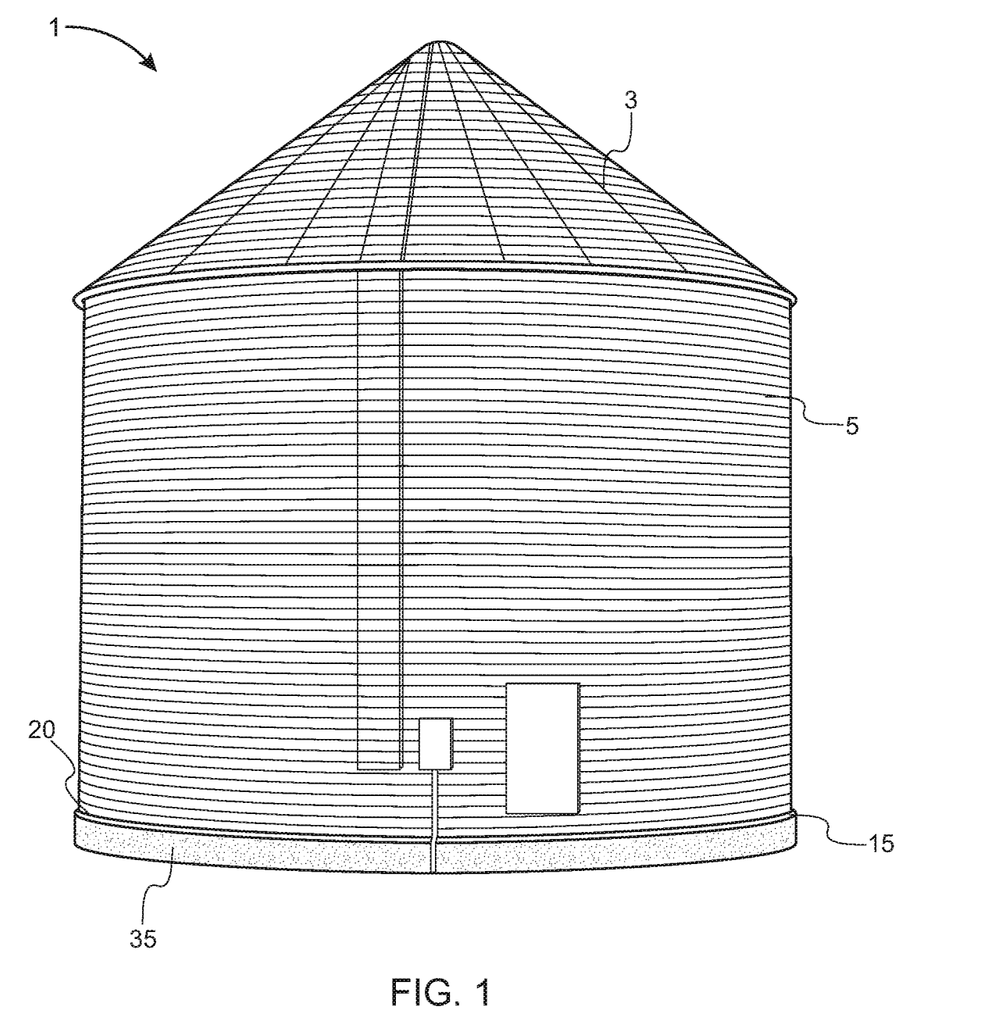
FIG. 1 illustrates a grain bin in accordance with certain embodiments.

FIG. 1 illustrates a grain bin 1 in accordance with certain embodiments. Grain bin 1 is disposed on a concrete foundation 15. Grain bin 1 may be constructed from any suitable materials, such as metal (e.g., galvanized metal). A grain bin 1 may be susceptible to substantial rain, snowmelt, and condensation runoff from the large moisture-collecting footprint of the roof area of the bin. The large surface area and conical down slope design of the bin roof serves as a large receptor and shedder of moisture. The water cascades off the eaves of the bin and falls to the concrete foundation 15 of the bin. The concrete foundation 15 has a larger diameter than the bin 1. Moisture from rain or snow may collect and rest there until the slow processes of evaporation or wind have dissipated the moisture. Splashing and standing water at the bin base may flood under the base of the bin and damage and rot the grain inside of the bin. A large surface area of the inside bin floor may be affected by unwanted moisture seeping into the bin. Over time, the intruding moisture may also corrode and rust the base of the metal bin.

Annually filling the ever-occurring voids, cracks and gaps at the bin base 20 with various fillers has been the conventional and accepted method of attempting to prevent water damage to bins and grain. Historically, various materials have been used in attempts to prevent water from penetrating through the bin base 20 and damaging the bin and its contents. Polyurethane, galvanic polymers, tar, paint, mastic, putty, and caulk have all been used as temporary sealants. However, an inherent difficulty with retaining a seal at the base 20 of a grain bin results, at least in part, from seasonal heating and cooling temperatures. Contraction and expansion of a large circular bin such as 5 on top of concrete foundation 15 may result in the base circumference of the bin changing on a regular basis. This movement may damage the various sealants that may be used at the intersection (i.e., base 20) of the bin 1 and the concrete foundation 15 to protect the inside floor of the bin 1 and its contents from water encroaching from outside the bin. The circular shape of the bin 1 and equipment (e.g., fans) attached to or near the bin base 20 has impeded a feasible solution to this problem. Different sizes of concrete foundations and diameters of bins and their various attachments have also delayed development of a viable solution.

The rounded shape of the bin 1 also complicates the use of standard straight rain gutters. Eave heights, peculiar circular eaves, very limited and narrow access between bins and installation and maintenance-associated equipment such as man-lifts and other lifting devices have been formidable obstacles to overcome. In addition, fines, chaff, dirt, dust and other contaminants present around bins can quickly fill a gutter, reducing the gutter's effectiveness. Cleaning gutters at the edge and top of bin walls is virtually impossible in some areas of the bin. Man-lift baskets will not fit between closely placed bins. Man-lift vehicles cannot be driven between bins which greatly lengthens the needed boom reach to access bin eaves where the gutters are mounted. In addition, the high eaves of the bin 1 greatly increase the danger associated with efforts to clean and otherwise maintain the gutters.

Figure 2:
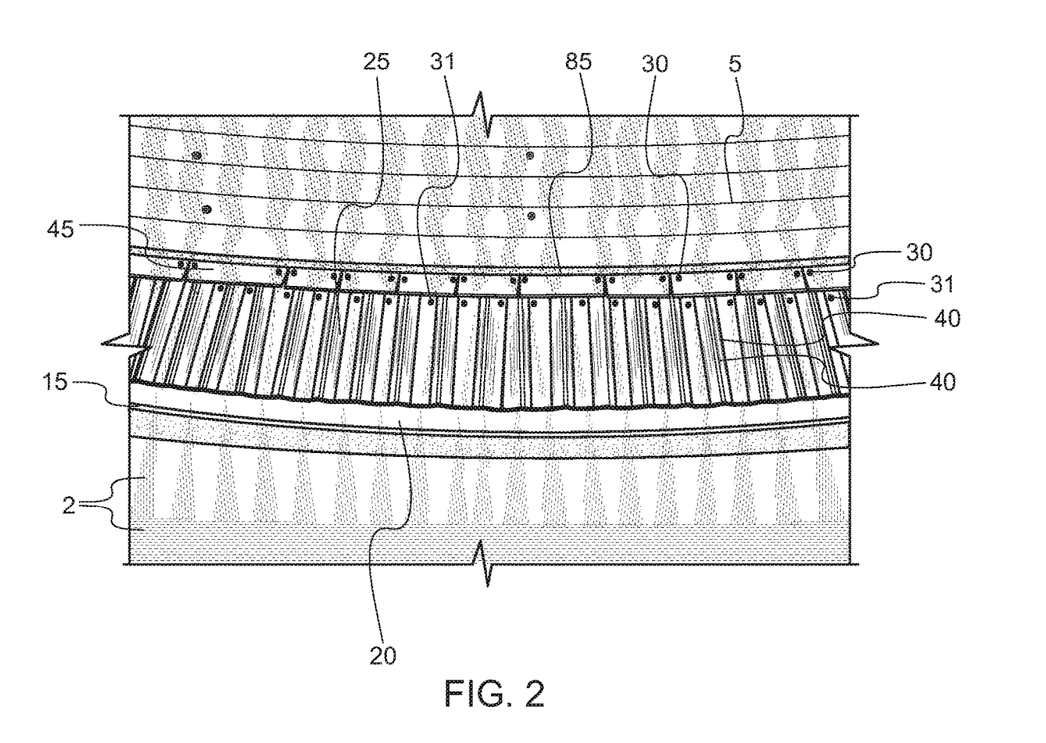
FIG. 2 illustrates a grain bin skirt to deflect moisture from a grain bin in accordance with certain embodiments.

FIG. 2 illustrates a grain bin skirt 25 to deflect moisture from a grain bin in accordance with certain embodiments. Various embodiments of the present disclosure solve the basic problem of moisture penetration at the bin base 20 by providing a bin skirt 25 that may include one or more sections coupled together around the perimeter of the bin 1 over the base 20 of the bin to protect the base from moisture penetration. In at least one embodiment, the one or more sections of skirt 25 may provide a continuous cover to the entire perimeter of the bin base 20 and the concrete foundation 15. The skirt 25 may reduce or eliminate standing water on the concrete foundation 15 and may deflect water 2 (e.g., down the wall 5 of the bin or otherwise descending towards the bin base 20) away from the bin base 20.

In order to keep the skirt 25 light and cost of materials within reason, the bin skirt 25 may include periodic bends, partial folds, corrugations, or other manipulations to provide added strength and ruggedness. In a particular embodiment, the skirt comprises sheet metal. In other embodiments, wood, plastics or other materials may be used for the skirt.

In a particular embodiment, skirt 25 entirely covers the concrete foundation 15 (e.g., the top edge of the skirt 25 is generally flush with the wall of the grain bin 1 and the bottom edge of the skirt 25 extends past the outer edge of the concrete foundation 15) and channels the water 2 past the edge of the concrete foundation 15 to the ground below. In a particular embodiment, the skirt 25 is not attached or adhered to the concrete but simply hangs over the concrete foundation 15, thereby allowing for bin expansion and contraction. Bin movement is transferred via the skirt 25, which may slide back and forth over the concrete foundation 15. Although in some embodiments the outside edge of the skirt may be attached to the concrete foundation 15, this may cause the skirt 25 to be damaged because of the pressure of the expansion and contraction of the bin 1.

Figure 3:
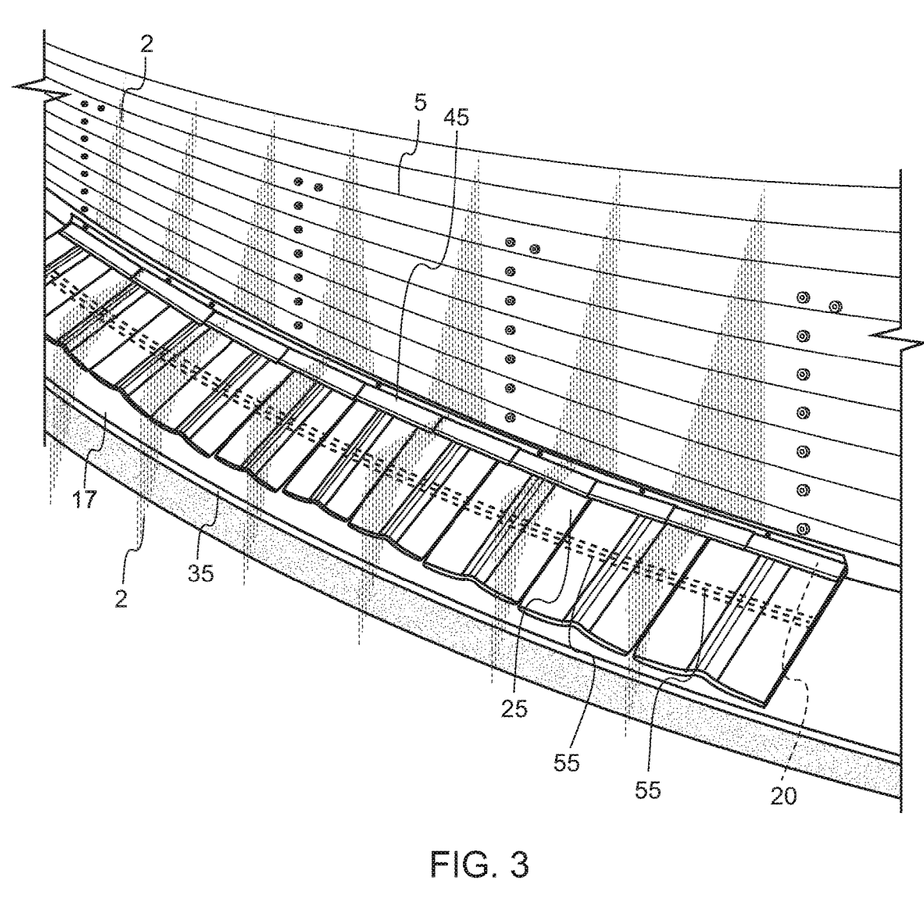
FIG. 3 illustrates a wide concrete foundation, grain bin skirt, and dam in accordance with certain embodiments.

In some embodiments, in order to provide cover from moisture 2 on all critical areas of the exposed concrete foundation 15 with the bin skirt 25, the lower edge of the bin skirt 25 may overhang past the edge 35 (an example outer edge 35 is depicted in FIG. 3) of the concrete foundation 15 at one or more portions of the foundation 15 (or around the entire foundation edge 35). In some embodiments, the lower edge of the skirt 25 (or a portion thereof) may rest on the outer edge of the concrete foundation 15. In some embodiments, at least a portion of the lower edge of the skirt 25 may rest on the concrete foundation 15, either at the edge 35 of the foundation 15 or further inward on the foundation.

The one or more sections of the skirt 25 may be screwed, riveted, bolted, glued, suspended by tension devices, fused or welded, hung, compressed or otherwise attached to the bin wall 5 around the perimeter of the bin. In the embodiment depicted, bin skirt 25 is attached to the wall 5 of the grain bin 1 using screws 31 placed periodically along the upper edge of the bin skirt 25. A section of skirt 25 may also be screwed (e.g., via screws 31) or otherwise attached (e.g., via any of the methods of attachment described above or through other suitable methods) to one or more adjacent sections of the skirt 25. Thus, in at least some embodiments, a screw 31 or other means of attachment may be used to attach a section of the skirt 25 to both the grain bin and to an adjacent section of the skirt 25 (e.g., the screw may penetrate two sections of the skirt 25 as well as the wall 5 of the grain bin 1 to secure both sections together and to the wall 5). Fitment, tightness, pressure against concrete, strength and rigidity may all be controlled and provided by tension resulting from the attaching screws 31 or other fasteners. In a particular embodiment, the upper edge of bin skirt 25 may be attached (e.g., screwed) to the bin wall 5 in periodic intervals. In various embodiments, the upper edge of bin skirt 25 may be bent slightly to fit flush against bin wall 5. The depicted screws 31 are generally screwed through the upper edge of the elongated section of bin skirt 25 and into bin wall 5.

Bins and grain bin concrete foundations are generally round but come in many different sizes. Distance also varies between the circumference of the bin base and distance to the outside corner edge of concrete foundation. Bin skirt 25 and its component sections may be custom-sized to fit such combinations.

The bin skirt 25 may follow the rounded shape of the bin and outside edge 35 of the rounded concrete foundation 15. In various embodiments, the skirt 25 may be disposed in any of various angles with respect to the plane of the top of foundation 15. In a particular embodiment, the skirt 25 is disposed at an angle between 15 degrees and 75 degrees with respect the top of the foundation. In a particular embodiment, the skirt 25 is disposed at an angle of approximately 45 degrees. The skirt 25 may be disposed at any suitable angle that allows for shielding of the concrete foundation 15 and bin base 20 from moisture and retain desired strength from the semi-vertical profile of the skirt 25. Generally, the upper edge of the skirt 25 attached to the bin wall 5 will be higher than the lower edge of the skirt 25 positioned away from the bin wall 5 such that gravity may act to propel moisture down across the skirt and away from the bin wall 5.

The slope of the skirt in relation to the concrete foundation may determine the effectiveness of the skirt. A sloped skirt may deflect water elements 2, such as water, ice, snow, and hail falling from the bin roof eaves and striking the skirt 25, glancing or falling away from the bin base 20 and concrete foundation 15 where they will fall harmlessly to the ground.

In a particular embodiment, the angle of the skirt 25 provides inward and downward pressure from the wind, keeping the wind from catching the skirt 25 and tearing it away from the bin 1. For example, skirt 25 may be placed in a horizontal position on the concrete foundation 15, thus covering the concrete foundation 15, but the wind may catch under the skirt, causing damage to or destruction of the skirt 25. Such danger may be alleviated in some embodiments by also attaching the skirt to the concrete foundation using any fastening means described herein or other suitable fastening means.

The upper portion of the skirt 25 may be secured to a bin wall 5 to keep this portion secured and fixed to the grain bin 1. Supporting structures for a grain bin, such as electrical conduit, bin stiffeners, grain tubes, and other attachments can be easily accommodated by slicing, bending or otherwise manipulating the skirt 25 to conform around the shapes of such supporting structures (e.g., in some embodiments, skirt 25 may be made of a thin, impervious, and flexible material lending itself to be shaped according to the application).

In a particular embodiment, vertical corrugations 40 (displayed in more detail in FIG. 4) are present in the bin skirt 25 in a periodic pattern which provide strength and flexibility to the skirt. These corrugations also allow the skirt to flex, giving the skirt the ability to expand along its outside edge (i.e., the edge furthest from the bin wall 5), accommodating the larger outside circumference away from the bin on or near the outside of the concrete foundation 15 as compared to the smaller diameter of the bin wall 5. At the time of construction, a bin 1 may not be placed exactly on-center of its concrete foundation 15. Thus, the distance between the bin wall 5 and the edge of the concrete foundation 15 can vary. In various embodiments, the skirt 25 has flexibility that allows for these variances without the need to specifically form, cut and vary the design of the skirt. In a particular embodiment, the width of the skirt 25 is uniform around the bin and may cover all exposed areas of the horizontal concrete foundation 15. In another embodiment, the width of the skirt 25 is uniform around the bin but covers only a portion of the concrete foundation (an embodiment in which the skirt 25 covers only a portion of the concrete foundation is described in more detail in connection with FIG. 3.

In various embodiments, the upper edge of the bin skirt 25 may be made water tight by using a flashing 45 and/or sealant 85. In a particular embodiment, flashing 45 may be installed on the bin 1 over the skirt 25 and corrugations 40 to cover the gaps between the top of the skirt 25 and the bin wall 5. Notching, slicing, crimping or other modifications may be used on the flashing 45 to allow the flashing 45 to be applied in an on-going pattern to follow the round circumference of the bin 1. For example, the flashing may be formed using a rectangular piece of material and cuts may be made at periodic intervals on one side (e.g., almost but not all of the way through) of the rectangular piece. In the embodiment depicted, various such cuts are depicted in the flashing 45.

The upper portion of the flashing 45 may be screwed or otherwise fastened to the bin 1. The lower portion of the flashing 45 covers the upper open top corrugations 40 of the bin skirt 25. In various embodiments, sealant 85 (e.g., caulking or other filler) may be applied on the upper edge of the flashing 45 to prevent water 2 leaking past the inner-most portion of the skirt 25.

In various embodiments, flashing 45 may be placed along the entire (or substantially the entire) circumference of the bin wall 5. In other embodiments, flashing 45 may be placed along only a portion of the circumference of the bin wall 5. In various embodiments, sealant 85 may be placed along the entire (or substantially the entire) circumference of the bin wall 5. In other embodiments, sealant may be placed along only a portion of the circumference of the bin wall 5 (e.g., in areas in which substantial gaps are present between the flashing 45 and the bin wall 5).

FIG. 3 illustrates a wide concrete foundation 17, grain bin skirt 25, and dam 55 in accordance with certain embodiments. The wide concrete foundation 17 and grain bin skirt 25 may have any suitable characteristics of the various embodiments of foundation 15 and skirt 25 described herein. However, the wide concrete foundation 17 may be relatively large, such that the edge 35 of the foundation 17 extends a lengthy distance from the bin wall 5. For example, in some environments, new building codes may require larger diameter concrete foundations than older bins were required to have. Accordingly, it may be unreasonable to cover the entire concrete area of the exposed foundation 17 with the bin skirt. In such situations, the skirt 25 may divert and shield the downward splashing water 2 on the bin skirt 25 to an outer area of the concrete foundation 17 located away from the base of the bin 20. The water may then drain off the concrete edge 35 to the ground below.

As the lower edge of the skirt 25 does not extend past the edge 35 of the foundation 17, in some conditions water 2 may seep underneath the skirt 25 towards the bin base 20. In order to prevent such seepage, various embodiments may include a dam 55 disposed on the concrete foundation 17 and underneath the skirt 25, inward of the outside perimeter of the bin skirt 25 (and thus the dam 55 may be between the lower edge of the bin skirt 25 and the bin wall 5). The dam 55 may comprise sheet metal, tar, or other impermeable material encircling the bin 1 and blocking water 2 from encroaching back to the bin base 20.

In a particular embodiment, dam 55 may be installed by being embedded into concrete foundation 17 while the concrete is still wet at the time the concrete is poured. In other embodiments, in retrofit applications dam 55 may be attached to the hardened concrete of concrete foundation 17. The dam 55 may be attached to the concrete foundation in any suitable manner. For example, the dam 55 may be screwed, glued, tarred, sealed, or affixed using other suitable means. Dam 55 may comprise any suitable impervious material, such as sheet metal, angle iron, other metal, plastic, wood, tarred rope, a ridge of tar, other sealant, or other suitable material. In a certain embodiment, dam 55 may comprise a plurality of sections of sheet metal. In some embodiments, such sheet metal may be flexible and/or curved, such that the dam 55 may encircle the bin wall. In a particular embodiment, dam 55 may include a tar-covered or sealed rope that is affixed and sealed to the concrete foundation 17. Common materials such as dirt or clay could also be used as a dam and/or a soaking agent as an addition to or as an alternative to dam 55.

In various embodiments, dam 55 has a top edge or surface that is higher than the highest point of the concrete foundation 17 that is located outside the perimeter of the dam 55, so as to prevent water from flowing over the dam 55 in most conditions. In some embodiments (e.g., where the dam 55 comprises a pliable impervious material such as metal), the dam 55 may be bent at an angle to provide strength, correct positioning, and support (in some embodiments such bending may be performed after attachment of the dam 55 to the foundation 17). As one example, the dam 55 may extend upward at approximately ninety degrees from the point of the angle break with respect to the foundation 17 (thus the shape of a cross section of the dam 55 may resemble an L or backwards L). In various embodiments, the dam 55 may be notched or sliced at periodic intervals to allow for installation in a curved configuration on the concrete foundation 17 (or the dam 55 may include discrete sections that abut with other sections).

Since the dam 55 is not affixed or attached to the bin 1, the expansion and contraction of the bin does not affect the dam 55 or its moisture obstruction and repelling abilities. The water 2 may pool on the outside edge of the concrete foundation 17 but is prevented by the dam 55 from contacting or penetrating under the bin 1.

Figure 4:
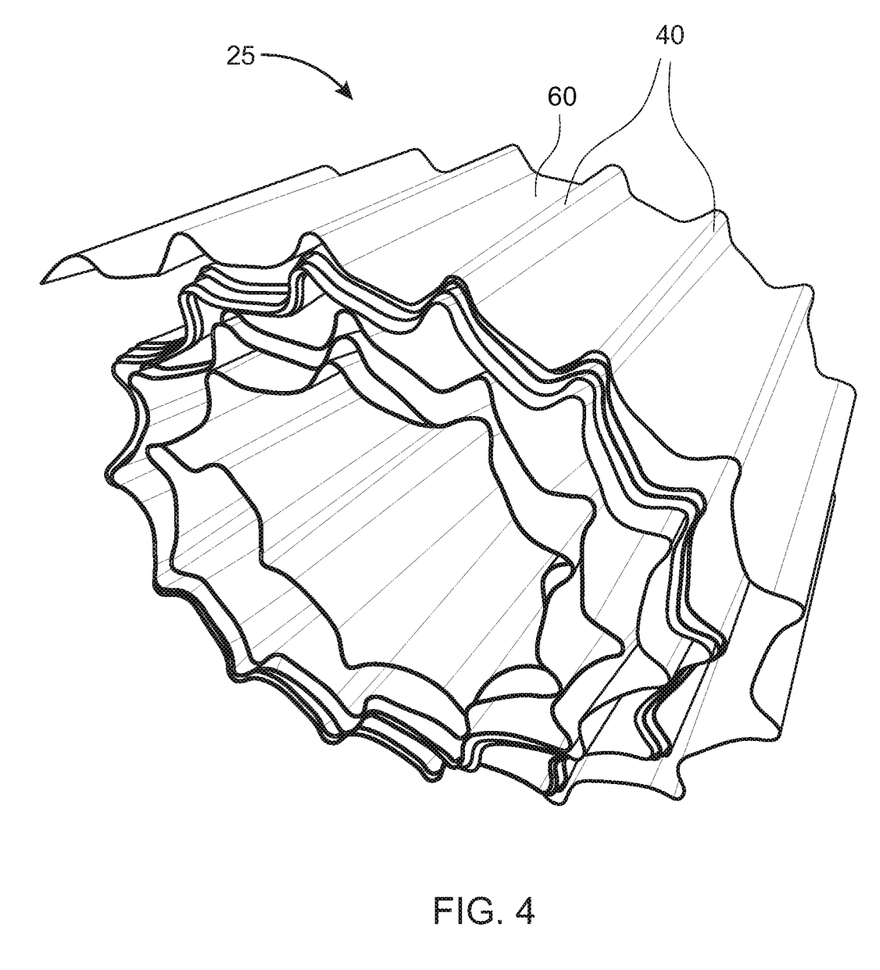
FIG. 4 illustrates a grain bin skirt rolled up for transport or storage in accordance with certain embodiments.

FIG. 4 illustrates a section of a grain bin skirt 25 rolled up for transport or storage in accordance with certain embodiments. In various embodiments, the light but strong corrugated properties of a skirt 25 comprising sheet metal may also lend to the favorable ability to be organized into a roll 60 for storage or shipment to the end user, installer, or other entity. The skirt section can be easily unrolled for attachment to a grain bin. The roll 60 may also provide the ability to bin workers to easily transport the skirt section to a bin for installation. Corrugations 40 do not impede rolling of skirt, but rather, the corrugations 40 may nest within other corrugations when rolled as depicted.

In various embodiments, corrugations of the grain bin skirt 25 may have any suitable shape. For example, in the embodiment depicted (which is depicted in more detail in FIGS. 4 and 5), the cross section of the grain bin skirt 25 comprises a generally flat portion, followed by an angled rising portion, another smaller flat portion, and then an angled falling portion. This pattern is then repeated. In another embodiment, the smaller flat portion is omitted and the angled rising portion is immediately followed by the angled falling portion. As another example, the cross section may be successive angled rising portions followed by angled falling portions (e.g., continuous "V" pattern). As other examples, the cross section may include a repeating pattern comprising a flat portion followed by any suitable curvature. Any other suitable bend patterns may be utilized according to preference, needs, tooling, and machining options available. In various embodiments, corrugations 40 are gradual vertical and horizontal bends instead of sharp bends. This allows for greater flexibility and stretch as the skirt 25 is attached to the bin wall 5. It may also allow for provide tension after installation against the concrete foundation 15, thus protecting against damage to the skirt from wind and weather.

Figure 5:
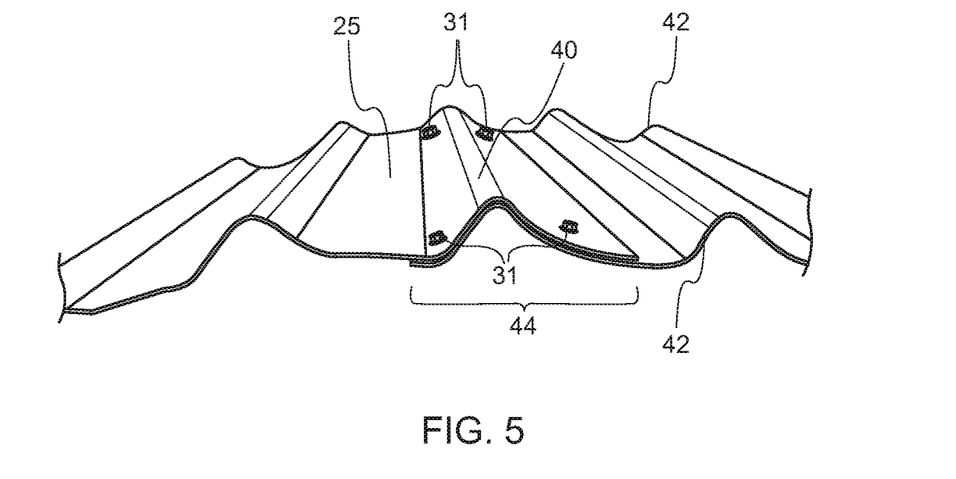
FIG. 5 illustrates a coupling of a section of a grain bin skirt to another section of the grain bin skirt in accordance with certain embodiments.

FIG. 5 illustrates a coupling of a section of a grain bin skirt 25 to another section of the grain bin skirt in accordance with certain embodiments. In a particular embodiment, skirt 25 may be produced in sections according to preferred lengths. Considerations of weight, size and height of sections may be made for ease and economy of shipping, handling, and installation. Corrugations 40 may be formed in skirt 25 for strength and stretch ability needs. Thickness of the material (e.g., metal) of the skirt 25 is also a consideration for strength, stretch ability, ease of handling and shipping, cost and installation. Sheet metal produced in approximately 26-gauge thickness has been found to be a viable thickness for skirt 25 but other thicknesses may be used in various embodiments. Skirt edges 42 may be rolled, doubled over, rounded (e.g., via filing or sanding), or manipulated in various configurations so that the sharp edges of the skirt are easier to handle, install and use and less likely to cut or injure persons who may come in contact with edges. Such configurations may also strengthen the skirt 25.

In a particular embodiment, sections of skirt 25 may be joined or overlapped together using one or more screws 31 or other means of attachment (such as any of the means of attachment described herein or other suitable means of attachment). In some embodiments, the means of attachment (e.g., screws 31) may be also used to fasten skirt 25 to bin wall 5. Corrugations 40 may make it easier to join the ends of sections up, may help the ends stay together, or may strengthen the connection between sections. In various embodiments, one or more corrugations of a first section of skirt 25 may be placed over corresponding one or more corrugations of a second section of the skirt 25 when the sections are attached together, such that the corrugations of the sections nest together. In the embodiment depicted, one corrugation 40 from a first section nests underneath a corresponding corrugation 40 from a second section, although in other embodiments, multiple corrugations of the first section may nest underneath multiple corrugations of the second section.

Figure 6:
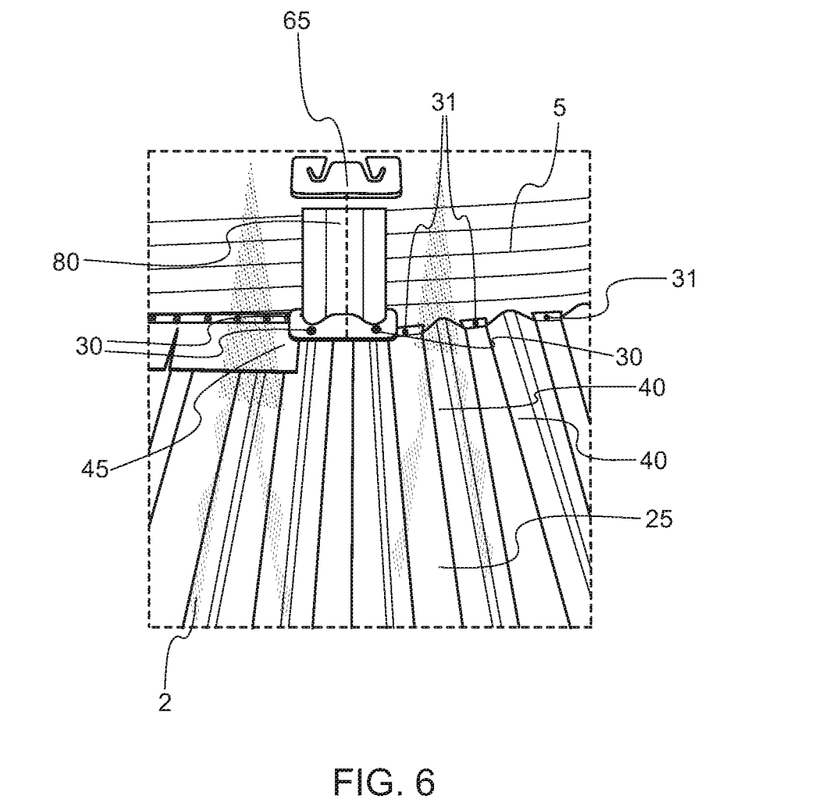
FIG. 6 illustrates a grain bin skirt, flashing, and custom covers in accordance with certain embodiments.

FIG. 6 illustrates a grain bin skirt 25, flashing 45, and a custom cover 65 in accordance with certain embodiments. In a particular embodiment, a custom cover 65 may be wrapped, fitted, and attached (e.g., via screws 30 or other suitable attachment means) to flashing 45 and/or bin skirt 25 around metal stiffeners 80 that are bolted around the outside surfaces of bin 1. Stiffeners 80 strengthen the structural integrity of bin 1. The custom formed covers 65 cover the gaps between the bin skirt 25, the stiffeners 80, the bin wall 5, and/or the flashing 45.

Cover 65 may comprise any suitable material, such as metal (e.g., sheet metal), duct tape, epoxies, rubber, or plastic strips or any non-porous material that would form an adequate shield over the bin skirt 25 and its corrugations 40, flashing 45, and/or stiffeners 80.

Figure 7:
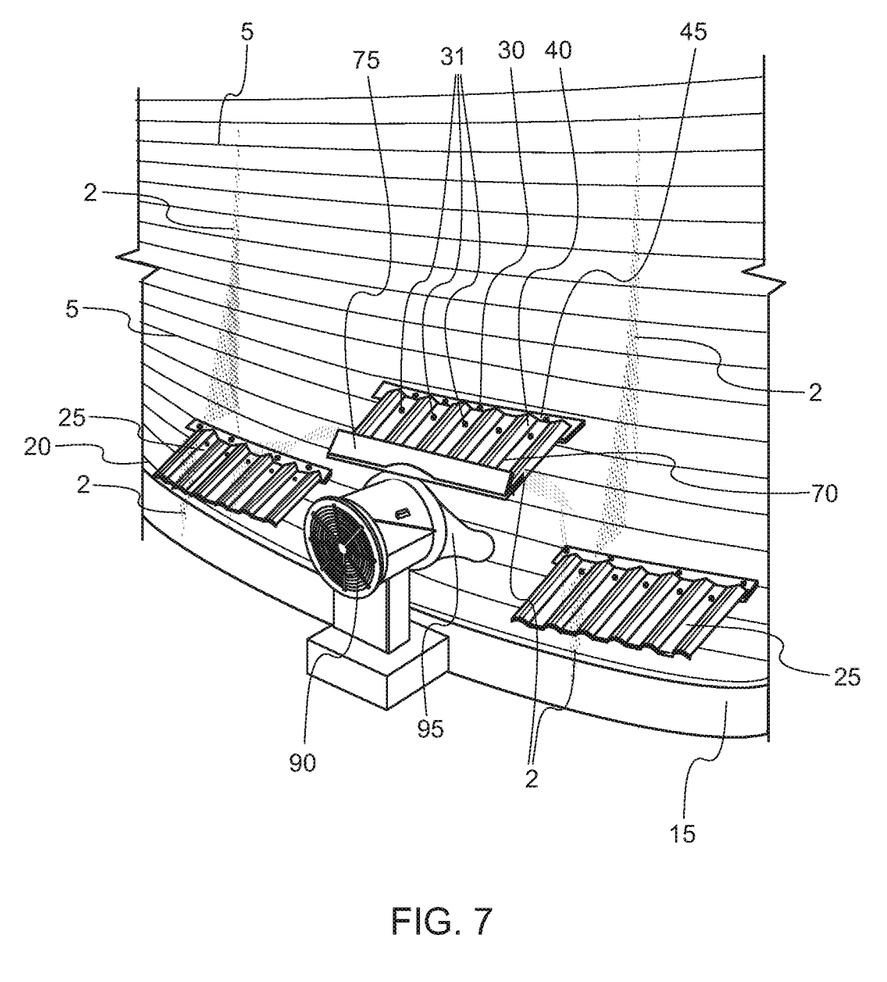
FIG. 7 illustrates grain bin skirt sections attached to a grain bin at each side of a fan and an upskirt and right angle piece attached to the bin and fan in accordance with certain embodiments.

FIG. 7 illustrates sections of grain bin skirt 25 attached to a grain bin wall 5 at each side of a fan 90 and an upskirt 70 and deflector 75 attached to the bin and fan in accordance with certain embodiments. A bin 1 may include obstructions to a continuous bin skirt 25, such as fans 90, fan transitions 95, doorways, etc. In a particular embodiment, in the case of said obstructions, bin skirts 25 may be mounted up to each side of an obstruction. For example, in the embodiment depicted, skirt 25 is installed up to both sides of fan 90 and fan transition 95. A section of upskirt 70 is then fastened to the bin 1 above the obstruction (e.g., fan 90 and fan transition 95). The upskirt 70 may have any suitable characteristics of skirt 25. However, a section of upskirt 70 may generally have a shorter length, normally spanning above and shielding the obstruction sufficiently to keep water 2 away from the bin wall 5 and the obstruction. In an embodiment, the lower end of the upskirt 70 may be fastened to the obstruction (e.g., fan 90 or transition 95) for support. Additional supports for lower section of upskirt may be added in other embodiments and may attached to the bin wall 5 or be disposed on the foundation 15. In general, an upskirt 70 may be fastened to the bin wall at a level that is higher than the level at which the skirt 25 is attached to the bin wall. The upskirt 70 may be fastened to the bin wall in any of the manners of fastening described herein with respect to skirt 25 being fastened to the bin wall or via other suitable methods.

In a particular embodiment, a deflector 75 may be coupled to the upskirt 70 at the lower edge of the upskirt. Additionally or alternatively, the deflector 75 may be coupled to the obstruction. The deflector 75 may be attached to the upskirt 70 or obstruction in any suitable manner, such as any of the methods of attachment described herein or other suitable methods.

In various embodiments, deflector may comprise a right-angled sheet metal, angle iron, or other impervious material. In various embodiments, the deflector is attached to the lower perimeter of the upskirt 70 above the obstruction (e.g., fan 90). The deflector 75 may have a portion that rises from the edge of the upskirt so as to impede water traveling down the upskirt 70. Another portion of deflector 75 may rest on or abut against the bottom edge of upskirt 70.

The deflector 75 provides a channel for water 2 to flow to either side of the deflector 75. The upward angled section of deflector 75 extends to each end along the bottom of the lower section of the upskirt 70, forming a diversion along the cross-section of upskirt 70 to each end of the deflector 75. Thus, water 2 dropping towards the fan 90, fan transition 95, doorway, or other obstruction will be accumulated by the upskirt 70, dropped to the deflector 75, and channeled to each end where it will drop harmlessly to the skirt 25 below and eventually to the ground. Areas of bin 1 with encumbrances such as fans 90, transitions 95, and other obstructions may be shielded from moisture 2 with the upskirt 70 and deflector 75. In other embodiments, the lower edge of the upskirt may extend past the obstruction and the deflector 75 may be omitted.

Various embodiments of the present disclosure eliminate standing or splashing water on grain bin bases and grain, while remaining effective despite grain bin expansion and contraction.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:
1. A system comprising
a bin comprising a round side wall and a conical roof; and
an impervious bin skirt, the bin skirt comprising at least one section, wherein a top portion of a first section of the bin skirt is attached to the side wall of the bin to shield at least a portion of a base of the bin from moisture penetration, wherein the first section comprises corrugated sheet metal.

2. The system of claim 1, wherein the impervious bin skirt further comprises a second section attached to the side wall of the bin and a first corrugation of the second section is substantially nested underneath a second corrugation of the first section.

3. The system of claim 1, wherein the first section hangs over and rests upon an edge of a concrete foundation upon which the bin is disposed.

4. The system of claim 1, wherein the first section is to rest upon a concrete foundation upon which the bin is disposed but not extend to an edge of the concrete foundation.

5. The system of claim 1, further comprising an impervious dam installed underneath the bin skirt and on a concrete foundation upon which the bin is disposed, the impervious dam to block moisture seeping under the bin skirt and towards the base of the bin.

6. The system of claim 1, wherein the bin skirt comprises a plurality of sections attached around at least a majority of a circumference of the bin.

7. The system of claim 1, further comprising an upskirt comprising an impervious material, a top portion of the upskirt attached to the side wall of the bin at a position that is higher than the top portion of the first section of the bin skirt, the upskirt to shield an attachment to the bin from moisture.

8. The system of claim 7, further comprising a deflector attached to the upskirt to channel moisture collected by the upskirt in a lateral direction to sides of the upskirt.

9. The system of claim 1, further comprising a flashing attached to the side wall of the bin over at least a portion of the bin skirt.

10. A system comprising an impervious bin skirt, the bin skirt comprising at least one section, a top portion of a first section of the bin skirt to couple to a side wall of the bin to shield a portion of a base of the bin from moisture penetration, wherein the first section comprises corrugated sheet metal.

11. The system of claim 10, wherein a second section of the bin skirt is to couple to the side wall of the bin and a first corrugation of the second section is to substantially nest underneath a second corrugation of the first section.

12. The system of claim 10, further comprising an impervious dam to be installed underneath the bin skirt and on a concrete foundation upon which the bin is disposed.

13. The system of claim 12, wherein the impervious dam comprises a plurality of sections of metal each comprising portions that rise from the concrete foundation.

14. The system of claim 10, further comprising an upskirt comprising an impervious material, a top portion of the upskirt to couple to the side wall of the bin at a position that is higher than the top portion of the first section of the bin skirt, the upskirt to shield an attachment to the bin from moisture.

15. The system of claim 14, further comprising a deflector comprising a first side that rises from a bottom edge of the upskirt to block moisture falling towards the bottom edge of the upskirt.

16. The system of claim 10, further comprising a flashing to be attached to the side wall of the bin over at least a portion of the bin skirt.

17. A method comprising:
attaching an impervious bin skirt to a bin by coupling a plurality of sections of the bin skirt to a side wall of the bin to shield a portion of a base of the bin from moisture penetration, wherein at least a first section of the plurality of sections comprises corrugated sheet metal.

18. The method of claim 17, further comprising attaching a flashing to the side wall of the bin, wherein at least a portion of the flashing is disposed over an upper edge of the bin skirt.

19. The method of claim 18, further comprising applying a waterproof sealant between the flashing and the side wall.

* * * * *